No. 740,596. PATENTED OCT. 6, 1903.
G. R. SHERWOOD.
HUSKING MACHINE.
APPLICATION FILED FEB. 2, 1903.
NO MODEL. 3 SHEETS—SHEET 1.

Witnesses:

Inventor:
George R. Sherwood,
By Robert Catherwood
Atty.

No. 740,596. PATENTED OCT. 6, 1903.
G. R. SHERWOOD.
HUSKING MACHINE.
APPLICATION FILED FEB. 2, 1903.
NO MODEL. 3 SHEETS—SHEET 3.

Witnesses:

Inventor:
George R. Sherwood,
By Robert Catherwood
Att'y

No. 740,596. Patented October 6, 1903.

UNITED STATES PATENT OFFICE.

GEORGE R. SHERWOOD, OF OAKPARK, ILLINOIS, ASSIGNOR TO NATIONAL FIBER & CELLULOSE CO., OF CHICAGO, ILLINOIS, A CORPORATION OF DELAWARE.

HUSKING-MACHINE.

SPECIFICATION forming part of Letters Patent No. 740,596, dated October 6, 1903.

Application filed February 2, 1903. Serial No. 141,615. (No model.)

*To all whom it may concern:*

Be it known that I, GEORGE R. SHERWOOD, a citizen of the United States, formerly residing in the city of Chicago, now of Oakpark, county of Cook, and State of Illinois, have invented certain new and useful Improvements in Husking-Machines, of which the following is a specification.

My invention relates to machines for removing the husks from the ears of corn; and its object is to provide a machine for this purpose which is at once simple, efficient, and reliable in its operations.

Figure 1:
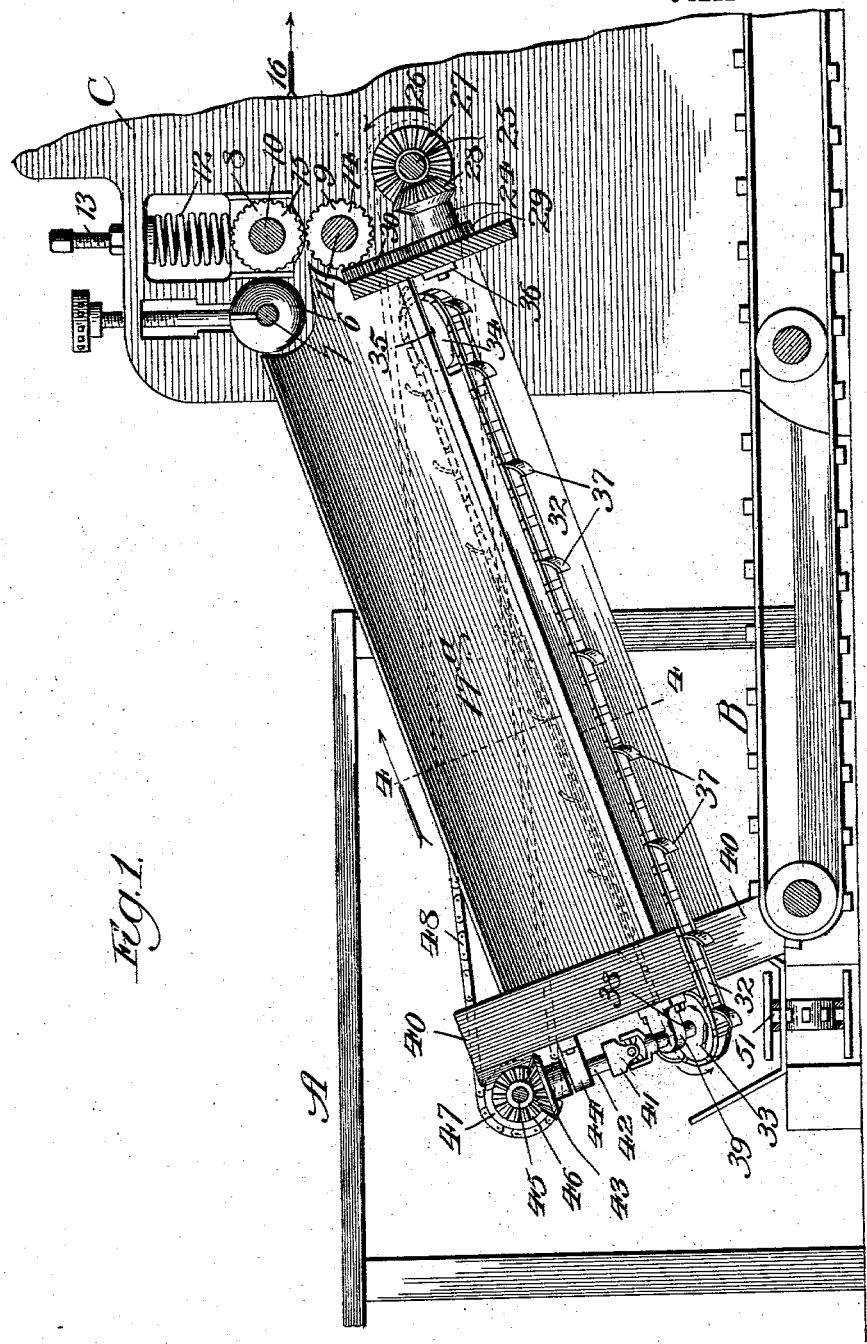
Figure 2:
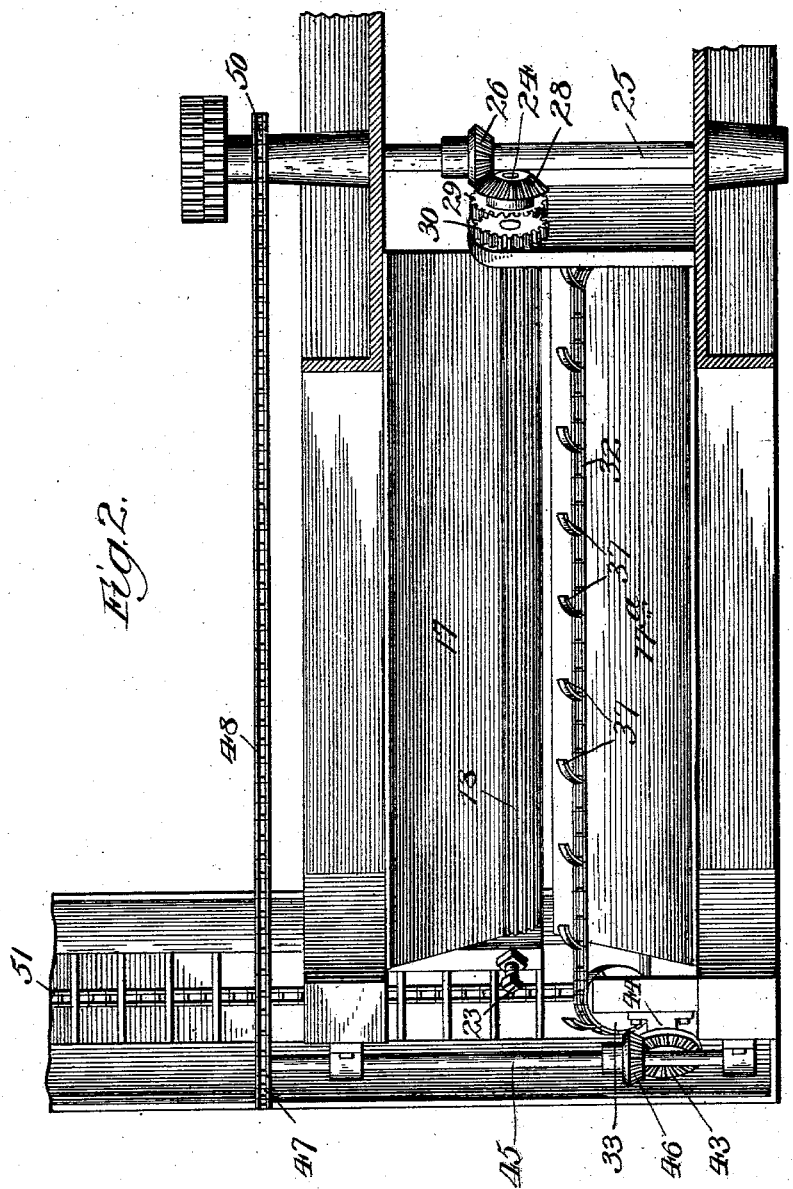
Figure 3:
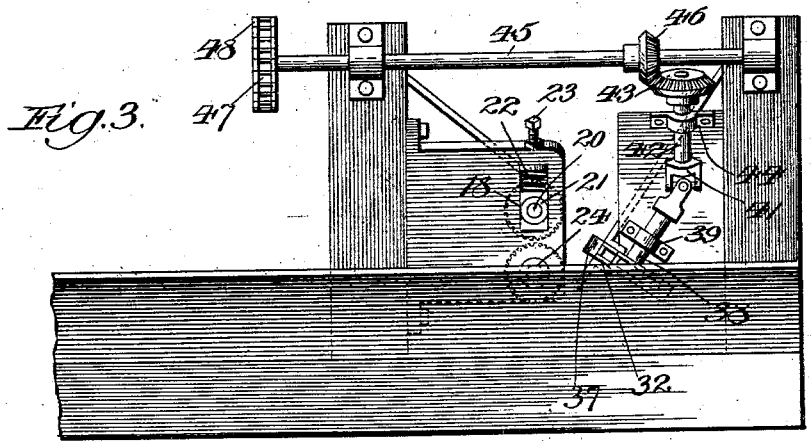
Figure 4:
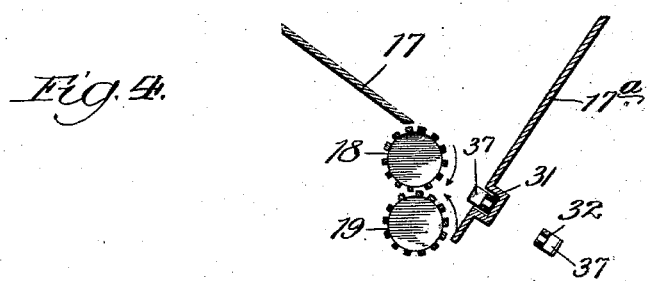
Figure 5:
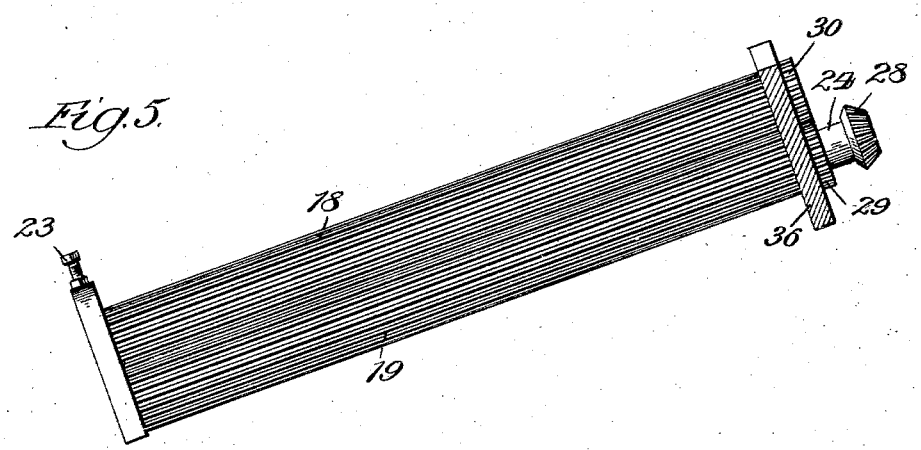

In the drawings, where like parts are denoted by like letters and numbers, Figure 1 is a side elevation of my machine, including some connected parts. Fig. 2 is a top plan view, and Fig. 3 a front elevation. Fig. 4 is a detail cross-section on line 4 4 of Fig. 1. Fig. 5 is a detail elevation of the two husking-rolls.

In the drawings I indicate the table for receiving the corn-plants as they come from the field by the letter A, Fig. 1. The corn-plants are pushed from the table A into the grasp of the snapping-rolls, preferably with their butts foremost. The two snapping-rolls 8 and 9 are corrugated and, mounted one above the other on shafts 10 and 11, revolve in opposite directions, their movement at the line of nearest approach being in the same directions. The upper roll is mounted in yielding bearings held in place by spring 12, adjustable by set-screws 13, its weight and the pressure exerted by spring 12 being sufficient to keep it in working position near roll 9, while it permits an elastic expansion of the channel through which the plants are progressing. Shaft 11 is attached to power and transmits rotary motion to roll 8 by means of gears 14 and 15. These nipping-rolls snap the ears from the stalk, drop them into the inclined hopper or trough 17, and drag the stalks and leaves in the direction of the arrow 16. Near the bottom of the hopper 17 17$^a$ are two husking-rolls, slatted or ribbed longitudinally and arranged vertically one above the other, as shown in Figs. 1 and 5. The upper roll 18 on shaft 20 is mounted in yielding bearing 21, held in place by spring 22, adjustable by set-screw 23, the lower roll 19 on shaft 24 being mounted in fixed bearings. Shaft 25 is actuated by power in the direction of the arrow 26 and has mounted upon it miter-gear 27, meshing with gear 28 on shaft 24 of the lower roll. The upper and lower rolls are provided with pinions 29 and 30, which mesh with each other and drive the upper roll in the opposite direction from the lower, so that the adjacent faces move one toward the other, as indicated by the arrows in Fig. 4. On either side of the husking-rolls are the guide-boards 17 17$^a$. In the guide-board 17$^a$ is a guideway 31 for the feed chain or carrier 32. On the lower end of the husker, Fig. 1, is mounted the sprocket 33, on the upper end the sprocket 34, mounted on bearings 35, bolted to the bracket 36, which is bolted to the stud carrying the upper end of the husking-rolls. These sprockets 33 and 34 are connected by endless chain 32, which has a number of backwardly-inclined spring-fingers 37 to hold the ears against the husking-rolls to clear the trough and to properly present the ears of corn in order that they may be gripped and torn from the husks, while the ears are free to pass onward without being pinched by the rolls. The sprocket 43 is mounted on a shaft 38 on bearings 39, bolted to the frame 40 of the husking-rolls. The shaft 38 is connected by a universal joint 41 to a shaft 42, which on its upper end carries a miter-gear 43. The shaft 38 is supported on bearing 44, bolted to frame 40. On shaft 45, extending across the rear husker, is miter-gear 46, which meshes with miter-gear 43 and drives the endless chain 32. The pulleys turn in the direction indicated by the arrows. Power is transmitted to shaft 45 by sprocket 47, mounted thereon, connected by the sprocket-chain 48 to sprocket 50, mounted in shaft 25.

Beneath the husking-rolls and at their rear is an endless conveyer 51 to carry the ears of corn from the machine after they have been husked. The husks are discharged from the opposite side of the rolls to that along which the ears travel onto the endless conveyer B, which may be operated in any convenient manner or its place taken by any suitable receptacle for the husks. C indicates any suitable frame or support for the husker, its operating-shaft 27, and the shafts of the snapping-rolls.

Having thus described my invention, what I claim as new, and wish to secure by Letters Patent, is—

1. The herein-described husking apparatus, consisting essentially of a pair of longitudinally-ribbed rolls rotating in opposite directions, mounted one above the other, and the endless chain 32 having the feeding-fingers 37 adapted to support and propel the ears of corn along the line of approach between the rolls on the side where the rolls are moving toward each other, for the purpose described.

2. The combination of the longitudinally-ribbed rolls, mounted one above the other, adapted to revolve in opposite directions, the endless chain with rearwardly-projecting feeding-fingers adapted to travel opposite the line of approach between the rolls on the side where the rolls move toward each other, adapted to propel the ears of corn along the line of approach in contact with the rolls, for the purpose described.

GEO. R. SHERWOOD.

Witnesses:
 WALTER WINBERG,
 ROBERT CATHERWOOD.